United States Patent
Wu et al.

(10) Patent No.: US 7,302,082 B2
(45) Date of Patent: Nov. 27, 2007

(54) METHOD FOR DETECTING MOTION PIXELS IN IMAGE

(75) Inventors: Quen-Zong Wu, Taoyuan (TW); Bor-Shenn Jeng, Taoyuan (TW)

(73) Assignee: Chunghwa Telecom Co., Ltd., Taoyuan (TW)

( * ) Notice: Subject to any disclaimer, the term of this patent is extended or adjusted under 35 U.S.C. 154(b) by 693 days.

(21) Appl. No.: 10/777,181

(22) Filed: Feb. 13, 2004

(65) Prior Publication Data

US 2005/0180600 A1   Aug. 18, 2005

(51) Int. Cl.
*G06K 9/00* (2006.01)
(52) U.S. Cl. .................................. 382/103
(58) Field of Classification Search ............ 382/107, 382/254, 270, 274
See application file for complete search history.

(56) References Cited

U.S. PATENT DOCUMENTS

| | | | | |
|---|---|---|---|---|
| 5,937,092 A | * | 8/1999 | Wootton et al. | 382/192 |
| 5,956,424 A | * | 9/1999 | Wootton et al. | 382/192 |
| 6,104,831 A | * | 8/2000 | Ruland | 382/173 |
| 6,788,818 B1 | * | 9/2004 | Krumm et al. | 382/209 |
| 2004/0042676 A1 | * | 3/2004 | Srinivasa | 382/254 |
| 2004/0218787 A1 | * | 11/2004 | Tagami et al. | 382/107 |

* cited by examiner

*Primary Examiner*—Samir Ahmed
*Assistant Examiner*—Claire X. Wang
(74) *Attorney, Agent, or Firm*—Rabin & Berdo, P.C.

(57) ABSTRACT

A method for detecting motion pixels in image includes the following steps. The difference image between current image and background image is firstly obtained. Then, a binarization threshold from the distribution of all absolute pixel values in the difference image is found. All or part of the pixel values, in difference image, whose absolute values are smaller than or equal to the binarization threshold is used to compensate the effect of illumination change and to obtain an updated difference image. The updated difference image is then binarized, and the binarized updated difference image whose values are high are determined motion pixels.

16 Claims, 3 Drawing Sheets

METHOD FOR DETECTING MOTION PIXELS IN IMAGE

BACKGROUND OF THE INVENTION

1. Field of the Invention

This invention relates to a method for detecting motion pixels in an image, in particular, used in digital monitoring systems, image processing systems and graphics identification systems.

2. Description of the Prior Art

A conventional method for detecting motion pixels in image is performed by subtracting background image from current image so as to obtain the difference image. Then, in the difference image, the pixel values whose absolute values are greater than preset threshold are used as a binarization threshold indicating motion pixels. On the other hand, the image difference resulted from illumination change is likely to be regarded as presence of motion pixels due to erroneous judgment.

Accordingly, the above-described prior art method is not a perfect design and has still many disadvantages to be solved. In views of the above-described disadvantages resulted from the conventional method, the applicant keeps on carving unflaggingly to develop a method for detecting motion pixels in image according to the present invention through wholehearted experience and research.

SUMMARY OF THE INVENTION

An object of the invention is to provide a method for detecting motion pixels in image, which is capable of automatically adjusting and judging whether the binarization threshold indicating motion pixels is present, depending on image complexity.

Another object of the invention is to provide a method for detecting motion pixels in image in order to prevent erroneous judgment of motion pixels in difference image due to illumination change.

The present invention relates to a method for detecting motion pixels in image by counting the occurrences of all absolute pixel values in the difference image between current image and background image or the updated difference image to plot a cumulative histogram, and finding a threshold for binarizing the pixel values from the cumulative histogram. Since the points in the cumulative histogram is in ascending order without irregular fluctuation of the typical bar chart, the threshold for binarizing the pixel values can be determined more easily. The present invention utilizes the approximation method to plot the cumulative histogram, wherein the turning point in ascending order or the point ascending the slowest is used as the binarization threshold. Since the difference image between current image and background image or the updated difference image is used to obtain a better binarized result, the motion pixels in the image can be detected more accurately than in the prior art. Furthermore, the present invention uses all or part of the pixel values, in the difference image, whose absolute values are smaller than or equal to the binarization threshold to compensate the effect of illumination change and to obtain the updated difference image. The effect of illumination change on the updated difference image is obviated accordingly.

These features and advantages of the present invention will be fully understood and appreciated from the following detailed description of the accompanying Drawings.

BRIEF DESCRIPTION OF THE DRAWINGS

The drawings disclose an illustrative embodiment of the present invention which serves to exemplify the various advantages and objects hereof, and are as follows.

These features and advantages of the present invention will be fully understood and appreciated from the following detailed description of the accompanying Drawings.

DETAILED DESCRIPTION OF THE PREFERRED EMBODIMENT

Figure 1:
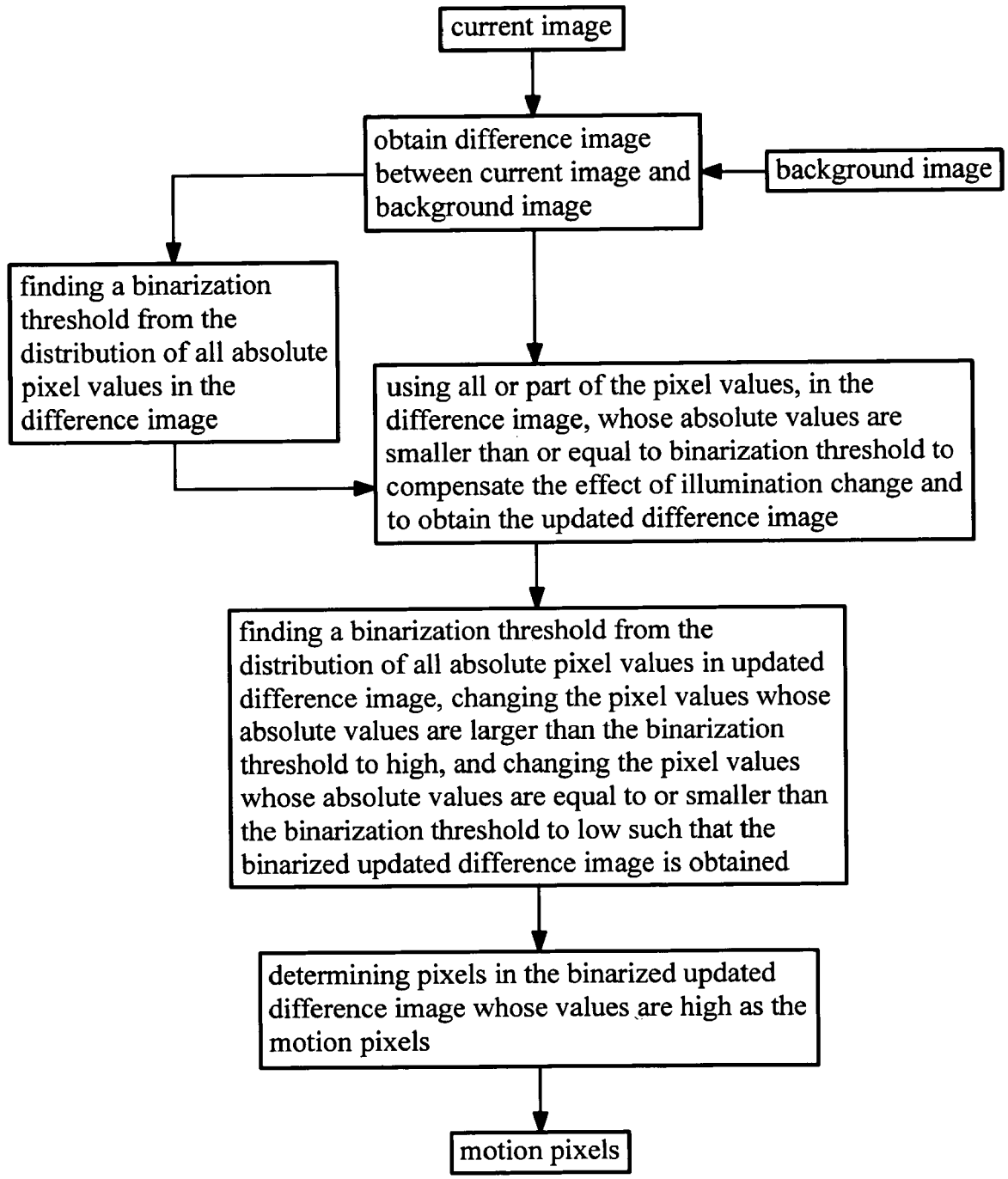
FIG. 1 is a flowchart of an embodiment according to the present invention.
Figure 3:
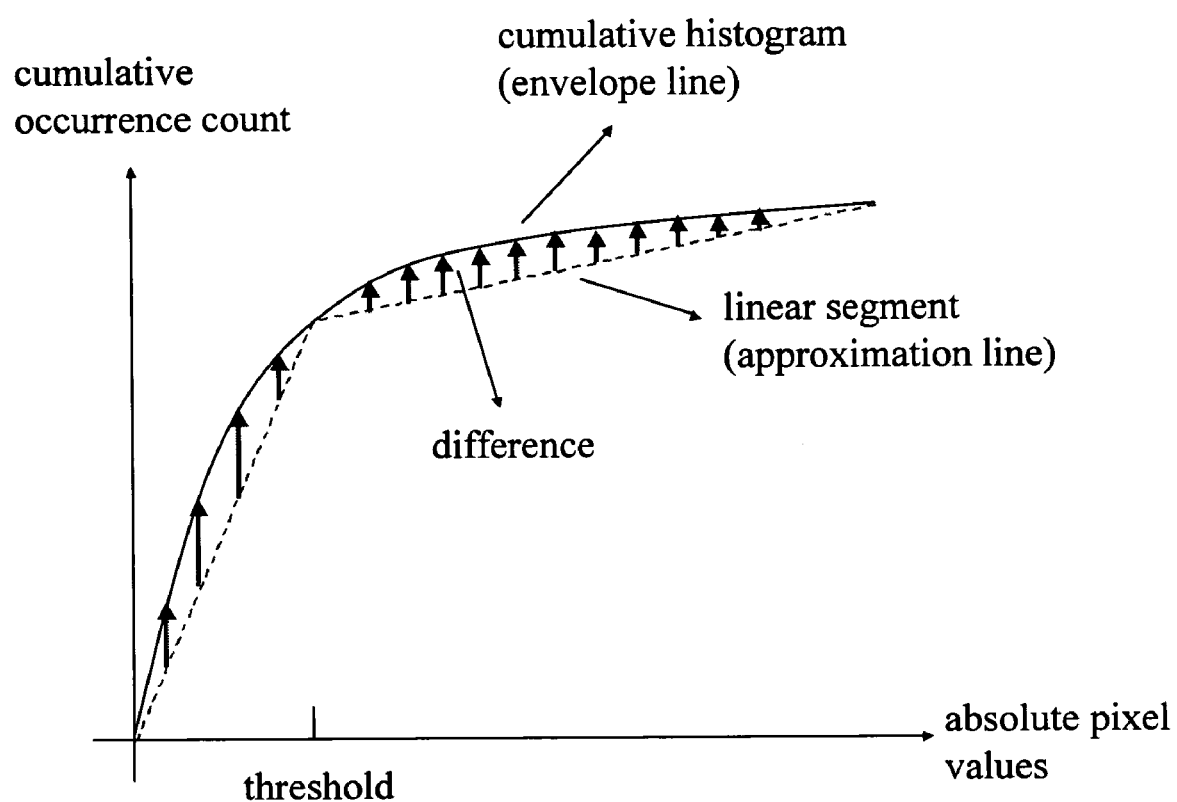
FIG. 3 is a schematic diagram of an embodiment of finding a binarization threshold from the cumulative histogram of absolute pixels.

Referring to FIG. 1, a method for detecting motion pixels in image comprises the following steps:

Step 1: obtaining difference image between current image and background image, wherein the counting way can be performed by subtracting the background image from the current image, eliminating the background image from the current image or subtracting the background image after performing a logarithmic operation from the current image after performing a logarithmic operation;

Step 2: finding a binarization threshold from the distribution of all absolute pixel values in the difference image, wherein an embodiment of finding a binarization threshold from the difference image or the updated difference image and illustrated with reference to the flowchart of FIG. 2 comprises the following sub-steps:

2-1: counting the occurrences of all absolute pixel values to plot the cumulative histogram, wherein the transverse axis of the cumulative histogram indicates all possible absolute pixel values arranged in ascending order, and the longitudinal axis indicates the cumulative occurrence count equal to or smaller than the absolute pixel values;

2-2: finding a value between the minimum absolute pixel value and the maximum absolute pixel value, such that the two linear segments constructed by the occurrence count of the minimum absolute pixel value, the cumulative occurrence count of the absolute pixel values equal to or smaller than the selected value and the cumulative occurrence count of the absolute pixel values equal to or smaller than the maximum absolute pixel value optimally approximate the cumulative histogram; and defining this value as the binarization threshold; Referring to FIG. 3, an embodiment of finding a binarization threshold from cumulative histogram of absolute pixels is illustrated. Provided that the coordinate of every point in the linear segments constructed by the minimum absolute pixel value, the selected value and the maximum absolute pixel value is defined as $(i, L_i)$, and the coordinate of every point in the envelope line of the cumulative histogram is defined as $(i, E_i)$, the pixel value obtaining the minimum of $$\sum_i |L_i - E_i|$$

is the binarization threshold. Alternatively, the pixel value obtaining the minimum of $$\sum_i (L_i - E_i)^2$$

is also regarded as the binarization threshold. Alternatively, the pixel value obtaining the maximum correlation coefficient of $\{L_i\}$ and $\{E_i\}$ sequences can also be regarded as the binarization threshold.

Step 3: using all or part of the pixel values, in the difference image, whose absolute values are smaller than or equal to binarization threshold to compensate the effect of illumination change and to obtain the updated difference image; in the compensating method, an average value of all or part of the pixel values, in difference image, whose absolute values are smaller than or equal to binarization threshold is used as a correction value, and then the updated difference image is obtained by subtracting this correction value from difference image or eliminating this correction value from difference image.

Figure 2:
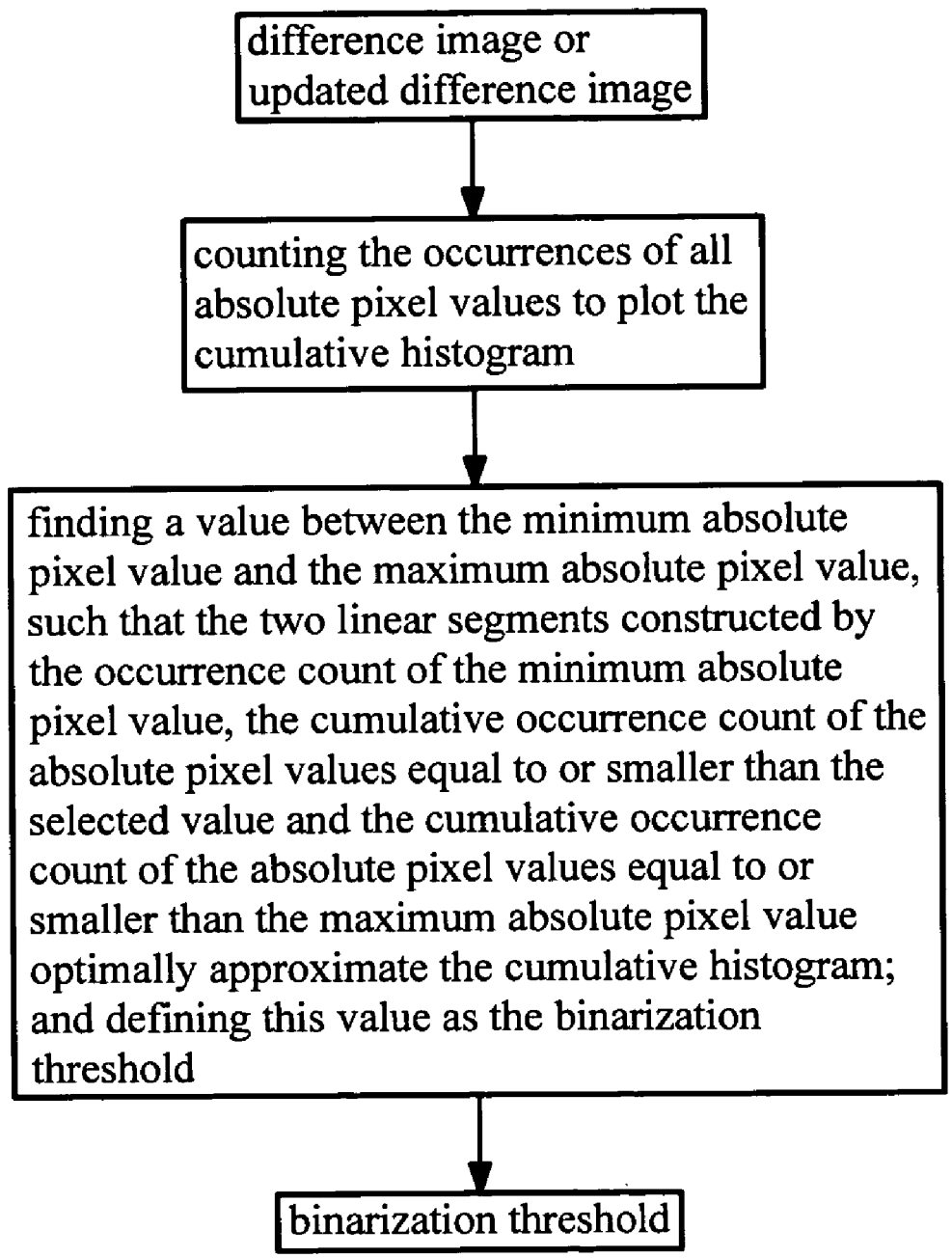
FIG. 2 is a flowchart illustrating an embodiment of finding a binarization threshold from the difference image or the updated difference image according to the present invention.

Step 4: finding a binarization threshold from the distribution of all absolute pixel values in updated difference image, changing the pixel values whose absolute values are larger than the binarization threshold to high, and changing the pixel values whose absolute values are equal to or smaller than the binarization threshold to low such that the binarized updated difference image is obtained through these steps, wherein an embodiment of finding a binarization threshold from the difference image or the updated difference image and illustrated with reference to the flowchart of FIG. 2 comprises the following sub-steps:

4-1: Counting the occurrences of all absolute pixel values to plot the cumulative histogram, wherein the transverse axis of the cumulative histogram indicates all possible absolute pixel values arranged in ascending order, and the longitudinal axis indicates the cumulative occurrence count of the absolute pixel values;

4-2: Finding a value between the minimum absolute pixel value and the maximum absolute pixel value, such that the two linear segments constructed by the occurrence count of the minimum absolute pixel value, the cumulative occurrence count of the absolute pixel values equal to or smaller than the selected value and the cumulative occurrence count of the absolute pixel values equal to or smaller than the maximum absolute pixel value optimally approximate the cumulative histogram; and defining this value as the binarization threshold; Referring to FIG. 3, an embodiment of finding a binarization threshold from cumulative histogram of absolute pixels is illustrated. Provided that the coordinate of every point in the linear segments constructed by the minimum absolute pixel value, the selected value and the maximum absolute pixel value is defined as $(i, L_i)$, and the coordinate of every point in the envelope line of the cumulative histogram is defined as $(i, E_i)$, the pixel value obtaining the minimum of $$\sum_i |L_i - E_i|$$

is the binarization threshold. Alternatively, the pixel value obtaining the minimum of $$\sum_i (L_i - E_i)^2$$

is also regarded as the binarization threshold. Alternatively, the pixel value obtaining the maximum correlation coefficient of $\{L_i\}$ and $\{E_i\}$ sequences can also be regarded as the binarization threshold.

Step 5: The pixels in the binarized updated difference image whose values are high are determined as the motion pixels.

The method for detecting motion pixels in image provided by the present invention, when comparing with other previous conventional technologies, has following advantages:

1. The present invention utilizes the approximation method to plot the cumulative histogram, wherein the turning point in ascending order or the point ascending the slowest is used as the binarization threshold. Since the difference image between current image and background image or the updated difference image is used to obtain a better binarized result, the motion pixels in the image can be detected more accurately than in the prior art.

2. The present invention uses all or part of the pixel values, in difference image, whose absolute values are smaller than or equal to binarization threshold to compensate the effect of illumination change and to obtain the updated difference image. The effect of illumination change on the updated difference image is obviated accordingly.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A method for detecting motion pixels in an image, comprising the steps of:
    step 1: obtaining a difference image according to a difference between a current image and a background image;
    step 2: finding a first binarization threshold from a distribution of all absolute pixel values in said difference image;
    step 3: using all or part of the pixel values, in said difference image, whose absolute values are smaller than or equal to said first binarization threshold to compensate the effect of an illumination change and to obtain an updated difference image;
    step 4: finding a second binarization threshold from the distribution of all absolute pixel values in said updated difference image, changing the pixel values whose absolute values are larger than said second binarization threshold to high, and changing the pixel values whose absolute values are equal to or smaller than said second binarization threshold to low, thereby obtaining a binarized updated difference image; and step 5: determining pixels in said binarized updated difference image whose values are high as motion pixels;

wherein said step 2 includes the sub-steps of:
(1) counting occurrences of all absolute pixel values to plot a cumulative histogram of pixel values, wherein a transverse axis of said cumulative histogram indicates all possible absolute pixel values arranged in ascending order, and a longitudinal axis indicates a cumulative occurrence count equal to or smaller than the absolute pixel values;
(2) defining two linear segments constructed by (i) an occurrence count of the minimum absolute pixel value, (ii) said cumulative occurrence count of the absolute pixel values equal to or smaller than a selected absolute pixel value between the minimum and maximum absolute pixel values and (iii) said cumulative occurrence count of the absolute pixel values equal to or smaller than the maximum absolute pixel value, wherein said selected absolute pixel value includes all possible absolute pixel values between the minimum and maximum absolute pixel values;
(3) defining the coordinate of every point in the two linear segments as $(i, L_i)$, and defining the coordinate of every point in an envelope line of the cumulative histogram as $(i, E_i)$; and
(4) finding, among said selected pixel value, a pixel value that minimizes at least one of the sum $$\sum_i |L_i - E_i|,$$

the sum $$\sum_i (L_i - E_i)^2,$$

and the sum of the maximum correlation coefficient of $\{L_i\}$ and $\{E_i\}$ sequences, so as optimally to approximate the cumulative histogram, and designating said minimizing pixel value as said first binarization threshold.

2. The method for detecting motion pixels in an image according to claim 1, wherein said step 1 is performed by subtracting said background image from said current image.

3. The method for detecting motion pixels in an image according to claim 1, wherein said step 1 is performed by dividing said background image from said current image.

4. The method for detecting motion pixels in an image according to claim 1, wherein said step 1 is performed by subtracting said background image after performing a logarithmic operation from said current image after performing a logarithmic operation.

5. A method for detecting motion pixels in an image, comprising the steps of:
step 1: obtaining a difference image according to a difference between a current image and a background image;
step 2: finding a first binarization threshold from a distribution of all absolute pixel values in said difference image;
step 3: using all or part of the pixel values, in said difference image, whose absolute values are smaller than or equal to said first binarization threshold to compensate the effect of an illumination change and to obtain an updated difference image;
step 4: finding a second binarization threshold from the distribution of all absolute pixel values in said undated difference image, changing the pixel values whose absolute values are larger than said second binarization threshold to high, and changing the pixel values whose absolute values are equal to or smaller than said second binarization threshold to low, thereby obtaining a binarized updated difference image; and
step 5: determining pixels in said binarized undated difference image whose values are high as motion pixels;

wherein said step 2 includes sub-steps of:
(1) counting occurrences of all absolute pixel values to plot a cumulative histogram of pixel values, wherein a transverse axis of said cumulative histogram indicates all possible absolute pixel values arranged in ascending order, and a longitudinal axis indicates a cumulative occurrence percentage equal to or smaller than the absolute pixel values;
(2) defining two linear segments constructed by (i) an occurrence percentage of the minimum absolute pixel value, (ii) said cumulative occurrence percentage of the absolute pixel values equal to or smaller than a selected absolute pixel value between the minimum and maximum absolute pixel values and (iii) said cumulative occurrence percentage of the absolute pixel values equal to or smaller than the maximum absolute pixel value, wherein said selected absolute pixel value includes all possible absolute pixel values between the minimum and maximum absolute pixel values;
(3) defining the coordinate of every point in the two linear segments as $(i, L_i)$, and defining the coordinate of every point in an envelope line of the cumulative histogram as $(i, E_i)$; and
(4) finding, among said selected pixel value, a pixel value that minimizes at least one of the sum $$\sum_i |L_i - E_i|,$$

the sum $$\sum_i (L_i - E_i)^2,$$

and the sum of the maximum correlation coefficient of $\{L_i\}$ and $\{E_i\}$ sequences, so as optimally to approximate the cumulative histogram, and designating said minimizing pixel value as said first binarization threshold.

6. The method for detecting motion pixels in an image according to claim 1, wherein said step 3 is performed by using an average value of all or part of the pixel values, in said difference image, whose absolute values are smaller than or equal to said first binarization threshold as a correction value, and then subtracting said correction value from said difference image, thereby obtaining said updated difference image.

7. The method for detecting motion pixels in an image according to claim 1, wherein said step 3 is performed by using an average value of all or part of the pixel values, in said difference image, whose absolute values are smaller than or equal to said first binarization threshold as a correction value, and then dividing said correction value from said difference image, thereby obtaining said updated difference image.

8. The method for detecting motion pixels in an image according to claim 1, wherein said step of finding a binarization threshold from the distribution of all absolute pixel values in said difference image in step 4 comprises the sub-steps of:
   (1) counting occurrences of all absolute pixel values to plot a cumulative histogram of pixel values, wherein a transverse axis of said cumulative histogram indicates all possible absolute pixel values arranged in ascending order, and a longitudinal axis indicates a cumulative occurrence count equal to or smaller than the absolute pixel values;
   (2) defining two linear segments constructed by (i) an occurrence count of the minimum absolute pixel value, (ii) said cumulative occurrence count of the absolute pixel values equal to or smaller than a selected absolute pixel value between the minimum and maximum absolute pixel values and (iii) said cumulative occurrence count of the absolute pixel values equal to or smaller than the maximum absolute pixel value, wherein said selected absolute pixel value includes all possible absolute pixel values between the minimum and maximum absolute pixel values;
   (3) defining the coordinate of every point in the two linear segments as $(i, L_i)$, and defining the coordinate of every point in an envelope line of the cumulative histogram as $(i, E_i)$; and
   (4) finding, among said selected pixel value, a pixel value that minimizes at least one of the sum $$\sum_i |L_i - E_i|,$$

the sum $$\sum_i (L_i - E_i)^2,$$

and the sum of the maximum correlation coefficient of $\{L_i\}$ and $\{E_i\}$ sequences, so as optimally to approximate the cumulative histogram, and designating said minimizing pixel value as said first binarization threshold.

9. The method for detecting motion pixels in an image according to claim 1, wherein said step of finding a binarization threshold from the distribution of all absolute pixel values in said difference image in step 4 comprises the sub-steps of:
   (1) counting occurrences of all absolute pixel values to plot a cumulative histogram of pixel values, wherein a transverse axis of said cumulative histogram indicates all possible absolute pixel values arranged in ascending order, and a longitudinal axis indicates a cumulative occurrence percentage equal to or smaller than the absolute pixel values;
   (2) defining two linear segments constructed by (i) an occurrence percentage of the minimum absolute pixel value, (ii) said cumulative occurrence percentage of the absolute pixel values equal to or smaller than a selected absolute pixel value between the minimum and maximum absolute pixel values and (iii) said cumulative occurrence percentage of the absolute pixel values equal to or smaller than the maximum absolute pixel value, wherein said selected absolute pixel value includes all possible absolute pixel values between the minimum and maximum absolute pixel values;
   (3) defining the coordinate of every point in the two linear segments as $(i, L_i)$, and defining the coordinate of every point in an envelope line of the cumulative histogram as $(i, E_i)$; and
   (4) finding, among said selected pixel value, a pixel value that minimizes at least one of the sum $$\sum_i |L_i - E_i|,$$

the sum $$\sum_i (L_i - E_i)^2,$$

and the sum of the maximum correlation coefficient of $\{L_i\}$ and $\{E_i\}$ sequences, so as optimally to approximate the cumulative histogram, and designating said minimizing pixel value as said second binarization threshold.

10. The method for detecting motion pixels in an image according to claim 5, wherein said step 1 is performed by subtracting said background image from said current image.

11. The method for detecting motion pixels in an image according to claim 5, wherein said step 1 is performed by dividing said background image from said current image.

12. The method for detecting motion pixels in an image according to claim 5, wherein said step 1 is performed by subtracting said background image after performing a logarithmic operation from said current image after performing a logarithmic operation.

13. The method for detecting motion pixels in an image according to claim 5, wherein said step 3 is performed by using an average value of all or part of the pixel values, in said difference image, whose absolute values are smaller than or equal to said first binarization threshold as a correction value, and then subtracting said correction value from said difference image, thereby obtaining said updated difference image.

14. The method for detecting motion pixels in an image according to claim 5, wherein said step 3 is performed by using an average value of all or part of the pixel values, in said difference image, whose absolute values are smaller than or equal to said first binarization threshold as a correction value, and then dividing said correction value from said difference image, thereby obtaining said updated difference image.

15. The method for detecting motion pixels in an image according to claim 5, wherein said step of finding a binarization threshold from the distribution of all absolute pixel values in said difference image in step 4 comprises the sub-steps of:
   (1) counting occurrences of all absolute pixel values to plot a cumulative histogram of pixel values, wherein a transverse axis of said cumulative histogram indicates all possible absolute pixel values arranged in ascending order, and a longitudinal axis indicates a cumulative occurrence count equal to or smaller than the absolute pixel values;

(2) defining two linear segments constructed by (i) an occurrence count of the minimum absolute pixel value, (ii) said cumulative occurrence count of the absolute pixel values equal to or smaller than a selected absolute pixel value between the minimum and maximum absolute pixel values and (iii) said cumulative occurrence count of the absolute pixel values equal to or smaller than the maximum absolute pixel value, wherein said selected absolute pixel value includes all possible absolute pixel values between the minimum and maximum absolute pixel values;

(3) defining the coordinate of every point in the two linear segments as $(i, L_i)$, and defining the coordinate of every point in an envelope line of the cumulative histogram as $(i, E_i)$; and (4) finding, among said selected pixel value, a pixel value that minimizes at least one of the sum $$\sum_i |L_i - E_i|,$$

the sum $$\sum_i (L_i - E_i)^2,$$

and the sum of the maximum correlation coefficient of $\{L_i\}$ and $\{E_i\}$ sequences, so as optimally to approximate the cumulative histogram, and designating said minimizing pixel value as said first binarization threshold.

16. The method for detecting motion pixels in an image according to claim 5, wherein said step of finding a binarization threshold from the distribution of all absolute pixel values in said difference image in step 4 comprises the sub-steps of:

(1) counting occurrences of all absolute pixel values to plot a cumulative histogram of pixel values, wherein a transverse axis of said cumulative histogram indicates all possible absolute pixel values arranged in ascending order, and a longitudinal axis indicates a cumulative occurrence percentage equal to or smaller than the absolute pixel values;

(2) defining two linear segments constructed by (i) an occurrence percentage of the minimum absolute pixel value, (ii) said cumulative occurrence percentage of the absolute pixel values equal to or smaller than a selected absolute pixel value between the minimum and maximum absolute pixel values and (iii) said cumulative occurrence percentage of the absolute pixel values equal to or smaller than the maximum absolute pixel value, wherein said selected absolute pixel value includes all possible absolute pixel values between the minimum and maximum absolute pixel values;

(3) defining the coordinate of every point in the two linear segments as $(i, L_i)$, and defining the coordinate of every point in an envelope line of the cumulative histogram as $(i, E_i)$; and (4) finding, among said selected pixel value, a pixel value that minimizes at least one of the sum $$\sum_i |L_i - E_i|,$$

the sum $$\sum_i (L_i - E_i)^2,$$

and the sum of the maximum correlation coefficient of $\{L_i\}$ and $\{E_i\}$ sequences, so as optimally to approximate the cumulative histogram, and designating said minimizing pixel value as said second binarization threshold.

* * * * *